(12) United States Patent
Huang et al.

(10) Patent No.: US 12,269,216 B2
(45) Date of Patent: Apr. 8, 2025

(54) SIMILARITY-BASED ADDITIVE MANUFACTURING ALTERATIONS

(71) Applicant: PERIDOT PRINT LLC, Palo Alto, CA (US)

(72) Inventors: Wei Huang, Palo Alto, CA (US); Gary J. Dispoto, Palo Alto, CA (US)

(73) Assignee: PERIDOT PRINT LLC, Palo Alto, CA (US)

( * ) Notice: Subject to any disclaimer, the term of this patent is extended or adjusted under 35 U.S.C. 154(b) by 300 days.

(21) Appl. No.: 17/783,423

(22) PCT Filed: Jan. 13, 2020

(86) PCT No.: PCT/US2020/013337
§ 371 (c)(1),
(2) Date: Jun. 8, 2022

(87) PCT Pub. No.: WO2021/145852
PCT Pub. Date: Jul. 22, 2021

(65) Prior Publication Data
US 2023/0020856 A1 Jan. 19, 2023

(51) Int. Cl.
| | |
|---|---|
| *B33Y 50/02* | (2015.01) |
| *B29C 64/171* | (2017.01) |
| *B29C 64/393* | (2017.01) |
| *B33Y 10/00* | (2015.01) |

(52) U.S. Cl.
CPC ......... *B29C 64/393* (2017.08); *B29C 64/171* (2017.08); *B33Y 10/00* (2014.12); *B33Y 50/02* (2014.12)

(58) Field of Classification Search
CPC ............................... B33Y 50/02; B33Y 10/00
USPC .......................................................... 700/119
See application file for complete search history.

(56) References Cited

U.S. PATENT DOCUMENTS

| | | | |
|---|---|---|---|
| 8,429,174 B2 | 4/2013 | Ramani et al. | |
| 9,626,142 B2 | 4/2017 | Pettis et al. | |
| 9,688,024 B2 | 6/2017 | Stava | |
| 10,073,424 B2 | 9/2018 | Lin et al. | |
| 2018/0104898 A1* | 4/2018 | Laméris | B29C 64/386 |
| 2019/0126560 A1 | 5/2019 | Garcia Garcia et al. | |
| 2019/0275585 A1* | 9/2019 | Akram | B22F 1/10 |
| 2020/0130280 A1* | 4/2020 | Klosch-Trageser | B33Y 50/00 |

FOREIGN PATENT DOCUMENTS

| | | |
|---|---|---|
| EP | 3375607 A1 | 9/2018 |
| WO | 2019/194837 A1 | 10/2019 |

OTHER PUBLICATIONS

Zhang (NPL: Grouping parts for multiple parts production in Additive Manufacturing, Variety Management in Manufacturing Proceedings of the 47th CIRP Conference on Manufacturing Systems, 2014) (Year: 2014).*

* cited by examiner

*Primary Examiner* — Jigneshkumar C Patel
(74) *Attorney, Agent, or Firm* — SHOOK, HARDY & BACON L.L.P.

(57) ABSTRACT

In one example in accordance with the present disclosure, a method is described. According to the method, a characteristic of each of multiple three-dimensional (3D) objects to be printed is determined. 3D objects to be printed are grouped based on characteristic similarity. For a group of 3D objects to be printed, an additive manufacturing setting is altered based on the characteristics of the 3D objects to be printed that form the group.

15 Claims, 7 Drawing Sheets

SIMILARITY-BASED ADDITIVE MANUFACTURING ALTERATIONS

BACKGROUND

Additive manufacturing systems produce three-dimensional (3D) objects by building up layers of material. Some additive manufacturing systems are referred to as "3D printing devices" because they use inkjet or other printing technology to apply some of the manufacturing materials. 3D printing devices and other additive manufacturing devices make it possible to convert a computer-aided design (CAD) model or other digital representation of an object directly into a physical object.

BRIEF DESCRIPTION OF THE DRAWINGS

The accompanying drawings illustrate various examples of the principles described herein and are part of the specification. The illustrated examples are given merely for illustration, and do not limit the scope of the claims.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Additive manufacturing systems form a three-dimensional (3D) object through the solidification of layers of a build material. Additive manufacturing systems make objects based on data in a 3D model of the object generated, for example, with a computer-aided drafting (CAD) computer program product. The model data is processed into slices, each slice defining portions of a layer of build material that is to be solidified.

The characteristics of a 3D object to be printed affect the environmental conditions experienced during additive manufacturing. For example, due to the thermal nature of certain additive manufacturing processes, 3D printed objects with larger areas may have higher temperatures than parts of 3D printed objects that have smaller areas.

More specifically, in one form of additive manufacturing, a fusing agent is deposited on a bed of powder material. The fusing agent increases a thermal absorption of the underlying build material which is fused when heat energy is applied. Due to the increased surface area, those parts of the 3D printed object that are larger cool down more slowly and are thus hotter for longer periods of time. This increased temperature for a long period of time can lead to over-fusing which may lead to reduced geometric accuracy.

Accordingly, a detailing agent which inhibits build material fusing may be applied on these large areas to prevent over-fusing. However, some thermal-related part quality issues, such as under-fusion, warpage, bubbles, and elephant skins, may still result, especially when the parts are particularly large, or particularly small in size.

Accordingly, the present specification describes the alteration of manufacturing settings to accommodate for the particular characteristic, such as size, of the 3D object to be printed. For example, a powder build material bed temperature may be lowered to offset the increased temperature that larger 3D printed objects experience.

The present specification also groups 3D objects to be printed based on similar characteristics, and generates them simultaneously. For example, 3D objects with roughly the same size may be assigned to one additive manufacturing device while 3D objects with a different size may be assigned to a different additive manufacturing device. Doing so ensures that the adjustment to the additive manufacturing operations may enhance the part quality of each part to be formed, rather than just a subset. That is, smaller 3D objects may justify certain additive manufacturing alterations. Accordingly, if both small objects and large objects are to be formed together, and just the smaller objects are relied on to alter the additive manufacturing operations, the larger objects may be over-fused. By comparison, if the additive manufacturing operations are adjusted based on just the larger objects, the smaller objects may be under-fused.

Accordingly, the present specification describes methods and systems that group objects, based on their thermal behaviors, for batch printing. Such batch operation may refer to manufacturing different groups of 3D printed objects 1) in different additive manufacturing devices, 2) at different times on a particular additive manufacturing device, or 3) at different locations within a bed of the particular additive manufacturing device, which different locations may be thermally isolated from one another. In other words, according to the present specification, the 3D objects to be printed are grouped together, and printing and other manufacturing conditions are set based on their similar thermal behaviors. As a result, parts with similar thermal characteristics can be treated with customized print and cooling conditions.

Put another way, the present disclosure describes a method to determine thermal properties (such as amount of heat for a fusing process) of a plurality of 3D objects to be printed. 3D objects to be printed are grouped together based on the similar thermal properties. In some examples, different groups are assigned to different additive manufacturing devices or different regions of a print bed based on the thermal properties of the groups. Thus, the present specification optimizes the packing and manufacturing of similar objects to be printed for easier control and a better object quality.

While the present specification may refer to particular types of additive manufacturing devices, the 3D objects may be formed using any variety of additive manufacturing devices. That is, an additive manufacturing device refers broadly to any device that generates a 3D printed object. A few examples of different additive manufacturing devices that may be implemented are now presented.

In one example, to form the 3D printed object, a build material, which may be powder, is deposited on a bed. A fusing agent is then dispensed onto portions of the layer of build material that are to be fused to form a layer of the 3D printed object. The system that carries out this type of additive manufacturing may be referred to as a powder and fusing agent-based system. The fusing agent disposed in the desired pattern increases the energy absorption of the layer of build material on which the agent is disposed. The build material is then exposed to energy such as electromagnetic radiation. The electromagnetic radiation may include infra-red light, laser light, or other suitable electromagnetic radiation. Due to the increased heat absorption properties imparted by the fusing agent, those portions of the build material that have the fusing agent disposed thereon heat to a temperature greater than the fusing temperature for the build material. By comparison, the applied heat is not so great so as to increase the heat of the portions of the build material that are free of the agent to this fusing temperature. This process is repeated in a layer-wise fashion to generate a 3D object. The unfused portions of material can then be separated from the fused portions, and the unfused portions recycled for subsequent 3D formation operations.

Another way to form 3D printed objects is to selectively apply binder to areas of loose build material. In this example, a "latent" part is prepared inside a build bed filled with build material. The build bed may be transferred to a furnace where a first heating operation removes solvents present in the applied binder. As solvents are removed, the remaining binder hardens and glues together build material to convert the "latent" part into a "green" part. The green part is then removed from the bed. As a result of this operation, residual build material may be caked onto the green parts. It may be desirable to remove residual build material from green parts in a cleaning operation. In some examples, the green parts are loaded into a sintering furnace where applied heat can cause binder decomposition and causes the build material powder particles to sinter or fuse together into a durable solid form.

In yet another example, a laser, or other power source is selectively aimed at a powder build material, or a layer of a powder build material, to form a slice of a 3D printed object. Such a process may be referred to as selective laser sintering.

In one particular example of additive manufacturing referred to as laser fusion, an array of lasers scans each layer of powdered build material to form a slice of a 3D printed object. In this example, each laser beam is turned on and off dynamically during the scanning process according to the image slice. Similar to a fusing agent-based system, this laser fusion process is also layer-by-layer.

In yet another example, the additive manufacturing process may use selective laser melting where portions of the powder material, which may be metallic, are selectively melted together to form a slice of a 3D printed object.

As yet another example, in fused deposition modeling melted build material is selectively deposited in a layer where it cools. As it cools it fuses together and adheres to a previous layer. This process is repeated to construct a 3D printed object.

In yet another example, the additive manufacturing process may involve using a light source to cure a liquid resin into a hard substance. Such an operation may be referred to as stereolithography. Accordingly, a device which carries out any of these additive manufacturing processes may be referred to as an additive manufacturing device and in some cases a printer.

Accordingly, the present specification describes a method. According to the method, a characteristic of each of multiple 3D objects to be printed is determined and the 3D objects to be printed are grouped based on characteristic similarity. For a group of 3D objects to be printed, an additive manufacturing setting is altered based on the characteristics of the 3D objects to be printed that form the group.

The present specification also describes a system. The system includes an object grouper to group three-dimensional (3D) objects to be printed based on a similarity of a characteristic of the 3D objects to be printed. A device assigner of the system assigns different groups of 3D objects to be printed to different additive manufacturing devices. A setting controller alters, per group, additive manufacturing settings of the additive manufacturing devices based on the characteristics of the associated 3D objects to be printed.

The present specification also describes a non-transitory machine-readable storage medium encoded with instructions executable by a processor. The machine-readable storage medium comprising instructions that, when executed by a processor, determine, for 3D object to be printed, a thermal characteristic and group 3D objects to be printed based on characteristic similarity. The instructions also assign different groups of 3D objects to be printed to different additive manufacturing devices and select, per group, additive manufacturing settings based on the characteristics of the 3D objects to be printed that form the group. The instructions also determine, per group, a packing orientation of associated 3D objects to be printed in an additive manufacturing device and adjust, per 3D object to be printed within each group, selected additive manufacturing settings based on object-specific thermal characteristics for that 3D object to be printed. The instructions also control an additive manufacturing device based on adjusted additive manufacturing settings.

Such systems and methods 1) increase 3D printed object quality; 2) enhance consistency among different instances of a 3D printed object; 3) increase additive manufacturing efficiency; 4) optimize the packing of 3D objects to be printed for easier process control and better part quality; and 5) is simple, effective; and cost-effective to implement.

As used in the present specification and in the appended claims, the term "controller," "grouper," "assigner," and "analyzer" may refer to electronic components which may include a processor and memory. The processor may include the hardware architecture to retrieve executable code from the memory and execute the executable code. As specific examples, the controller as described herein may include computer readable storage medium, computer readable storage medium and a processor, an application specific integrated circuit (ASIC), a semiconductor-based microprocessor; a central processing unit (CPU), and a field-programmable gate array (FPGA), and/or other hardware device.

The memory may include a computer-readable storage medium which computer-readable storage medium may contain, or store computer usable program code for use by or in connection with an instruction execution system, apparatus, or device. The memory may take many types of memory including volatile and non-volatile memory. For example, the memory may include Random Access Memory (RAM), Read Only Memory (ROM), optical memory disks, and magnetic disks, among others. The executable code may, when executed by the controller cause the controller to implement at least the functionality of defining fracture patterns within a 3D printed object as described below.

Figure 1:
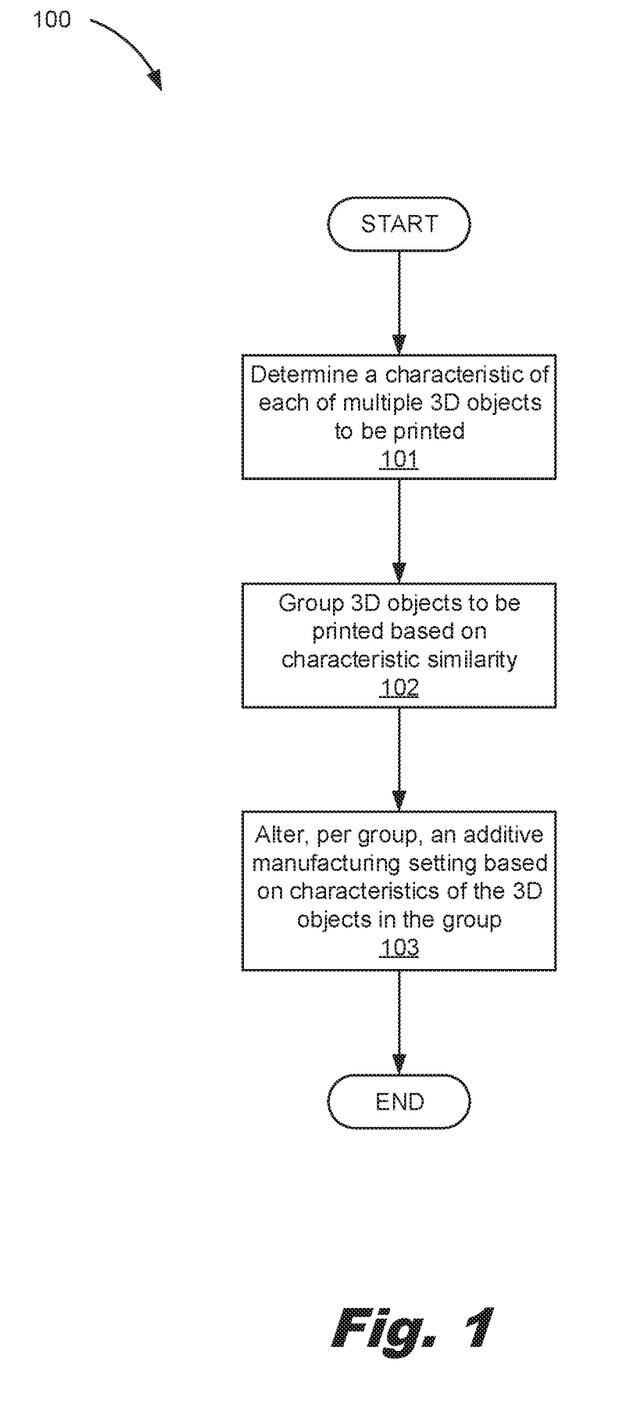
FIG. 1 is a flow chart of a method for altering additive manufacturing settings based on characteristic similarities, according to an example of the principles described herein.

Turning now to the figures, FIG. 1 is a flow chart of a method (100) for altering additive manufacturing settings based on characteristic similarities, according to an example of the principles described herein. According to the method (100), a characteristic is determined (block 101) for each of multiple 3D objects to be printed. That is, a queue for additive manufacturing may include a variety of 3D objects to be printed, each with different characteristics. In order to increase the strength and quality of these 3D printed objects, it may be desirable that certain manufacturing settings are used during additive manufacturing. However, as each 3D object to be printed may justify different settings and as 3D objects to be printed may be batch-produced in a single additive manufacturing device, it may be the case that the settings used during additive manufacturing don't optimize each part, as each part has different characteristics. Accordingly, the characteristics that are determined (block 101) may be used to group the 3D objects to be printed, such that the 3D objects to be printed in a particular group each trigger the same additive manufacturing settings. Accordingly, settings may be generated that are optimal for each 3D object to be printed in the group.

The characteristics that are determined (block 101) may be of a variety of types. For example, the characteristic may be a bounding box size for the 3D object to be printed.

In another example, the characteristic may be an average cross-sectional area of the 3D object to be printed. In this example, the overall size of the 3D object to be printed is not the consideration, but the feature size. For example, a lattice structure may be big, but because the structure itself has a small cross-sectional area, this object may be grouped with smaller objects that may have a similar or the same average cross-sectional area.

In other examples, the characteristic may be a non-dimensional characteristic. For example, the characteristic may be a color of the 3D object to be printed. That is, different colors have different rates of energy absorption. As a specific example, a 3D object to be printed that has a high density of black colorant will absorb more thermal energy than a 3D object to be printed that has a high density of yellow colorant.

In yet another example, an orientation of a 3D object to be printed is a characteristic upon which object grouping is based. For example, a thin plate may be considered a large object when it is printed horizontally. However, due to its thinness, it may be considered a small object when printed vertically.

As yet another example of a non-dimensional characteristic, the characteristic may be a thermal characteristic. As a particular example, thermal bleed refers to a phenomenon where heat from one voxel of powdered build material leaks to an adjacent thermal voxel. The amount of thermal bleed throughout a 3D object to be printed may affect the overall temperature of the 3D object to be printed throughout its manufacturing cycle, and may therefore be considered when setting additive manufacturing settings for that 3D object to be printed. In one example, determining (block 101) the thermal characteristics of a 3D object to be printed may be done via computer simulation.

Each of these characteristics may be indicative of a particular thermal behavior of the 3D objects to be printed. For example, 3D objects to be printed that have a large bounding box size may be more likely to be hotter during additive manufacturing and may therefore justify different alterations to the additive manufacturing process.

Different characteristics that are determined may lead to different accuracies in the grouping. For example, grouping via a bounding box size may provide a rough estimate of 3D objects that are likely to have a similar behavior. However, grouping via an average cross-sectional area may provide for a more accurate estimation of 3D objects to be printed that may experience similar responses to thermal conditions during additive manufacturing. Determining (block 101) a thermal characteristic of 3D objects to be printed via simulation provides yet more accuracy. Put another way, grouping (block 102) based on bounding box size may have a first degree of error, whereas grouping (block 102) based on average cross-sectional area may have a second degree of error that is less than the first, and grouping (block 102) based on thermal simulation may have a third degree of error that is less than both other specific examples described. Accordingly, the characteristic that is determined (block 101) may be based on a desired level of accuracy of the grouping.

Based on the characteristic determined (block 101), 3D objects to be printed may be grouped (block 102) based on characteristic similarity. That is, 3D printed objects that are within a predetermined range of one another with respect to the measured characteristic may be grouped (block 102). For example, 3D printed objects with an average thermal bleed that is within 20% of a specified value may be grouped (block 102) together. In another example, 3D objects to be printed that have an average cross-sectional area between 0.25 and 0.50 inches may be grouped together. While particular reference is made to groupings (block 102) based on certain criteria and certain grouping thresholds, groupings may be made based on any criteria, any number of criteria, and any number and value of grouping thresholds.

While particular reference is made to grouping (block 102) 3D objects to be printed based on a single characteristic, multiple characteristics may be relied on in the above-mentioned grouping (block 102) such that parts with similar responses to the manufacturing process can be batch-produced.

Based on the characteristics of the 3D objects to be printed that form a group, additive manufacturing settings for that group may be altered (block 103). That is, there are any variety of stages that an 3D object passes through as it is manufactured. Some of these stages may be printing stages and some may be post-printing stages, such as cooling. The parameters, or settings, of any of these stages may be altered (block 103) based on characteristics of the 3D objects that form the group.

One example of a setting that may be altered (block 103) is a bed temperature. As a specific example, some objects to be printed, i.e., large 3D objects may have a tendency to become too hot. Accordingly, for a group of large 3D objects to be printed, the system may lower the bed temperature to prevent over-heating of the large parts. By comparison, smaller 3D objects may have a tendency to not heat up as quickly during additive manufacturing and may cool quickly following fusing. Accordingly, for a group of smaller 3D objects to be printed, the system may increase the bed temperature to ensure the objects reach a temperature to trigger solidification. In other words, an adjustment to a bed temperature may be based on a size of the 3D object to be printed, with smaller objects triggering a higher bed temperature.

Another example of a setting that may be altered (block 103) is the energy source temperature. As described above, larger 3D objects, or 3D objects with larger average cross-sectional areas, may retain more heat energy. Accordingly, an overhead fusing lamp, which solidifies the build material, may be heated to a first temperature, for example 170 degrees Celsius, for a group of larger 3D objects, as compared to a group with smaller 3D objects, so the 3D objects to be printed do not over-fuse. By comparison, the overhead fusing lamp may be heated to a second temperature, for example 175 degrees Celsius, for a group of smaller 3D objects so the 3D objects to be printed are not under- or un-fused. In similar examples, an energy source activation time and/or energy source activation power may similarly be altered (block 103) for example by reducing activation time and/or power for larger 3D objects to be printed while increasing activation time and/or power for smaller 3D objects to be printed. In some examples, the alteration of activation time and/or speed may be carried out by adjusting a scanning speed of a carriage that retains the solidifying energy source.

As yet another example, a print mode may be adjusted. For example, different print modes may result in an energy source being activated different amounts of times to ensure fusing, Different quantity of activation cycles of the energy source may be applied based on the grouping. For example, for 3D objects that are smaller, or have a lesser degree of thermal bleed, the energy source may go through four activation cycles while for 3D objects that are larger, the energy source may go through two activation cycles. In some examples, different cycles refer to passes of a fusing lamp over the powdered build material bed.

In another example, an agent deposition setting may be altered (block 103). For example, as described above a detailing agent may be used to cool, or otherwise inhibit build material fusing. Given that larger 3D objects to be printed, or 3D objects to be printed with greater thermal bleed, are more prone to over-fusing, a larger amount of detailing agent may be deposited on groups of larger 3D objects to be printed, as compared to groups of smaller 3D objects to be printed, to prevent over-fusing. Given that larger 3D objects to be printed, or objects with generally lower temperatures are more prone to under-fusing, a larger amount of fusing agent may be deposited on groups of smaller 3D objects to be printed, as compared to groups of larger 3D objects to be printed, to ensure the build material of the smaller objects reaches sufficient temperatures to fuse.

As yet another example, a packing orientation may be altered. That is, for a group, the relative position of different 3D objects to be printed may be altered so as to enhance additive manufacturing for the objects to be printed.

While the present specification refers to relative sizes, i.e., smaller and larger, suffice it to say that the alteration (block 103) as described herein is based on the characteristics of the 3D objects to be printed that form a particular group and the indication of relative sizes illustrates how such print settings may be altered.

In some examples, the additive manufacturing settings that are altered (block 103) relate to post-processing operations. For example, a cooling time, or other cooling setting may be altered (block 103). In another example, it may be desirable to anneal a particular group of 3D printed objects and the annealing time may be adjusted based on characteristics of that group.

While particular reference is made to particular settings that may be altered (block 103), any type of setting may be adjusted. For example, the alteration (block 103) of the additive manufacturing settings may include selecting a group for manufacturing in a particular additive manufacturing device, determining a batch sequence of the 3D objects to be printed in a particular additive manufacturing device, and/or determining a batch location, within a print bed, of the 3D objects to be printed in a particular additive manufacturing device.

Accordingly, the present method (100) describes the grouping of certain 3D objects to be printed such that those parts that experience the same responses to manufacturing conditions may be grouped and have the associated additive manufacturing process altered so as to increase the part quality of each 3D printed object in that group, rather than adjusting manufacturing conditions for just a portion of the group, which would be the case were such grouping not to occur.

Figure 2:
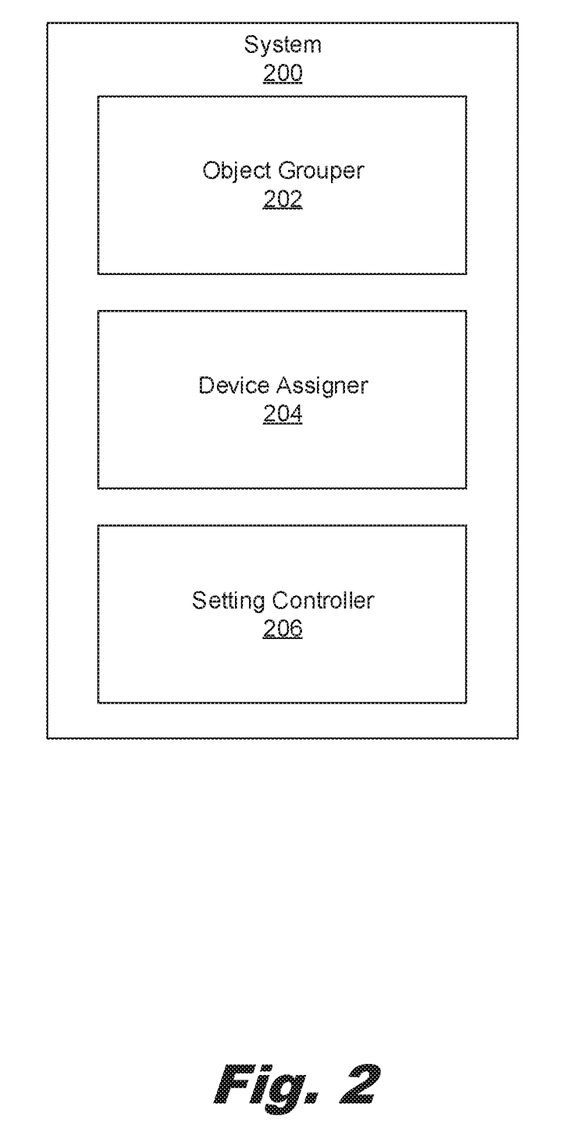
FIG. 2 is a block diagram of a system for altering additive manufacturing settings based on characteristic similarities, according to an example of the principles described herein.

FIG. 2 is a block diagram of a system (200) for altering additive manufacturing settings based on characteristic similarities, according to an example of the principles described herein. As described above, a 3D printed object may be formed by selectively hardening powdered build material in particular patterns. In some examples, characteristics of the object to be printed affect its response to manufacturing conditions. The present system (200) groups 3D objects to be printed based on similarity of those characteristics to alter additive manufacturing settings so that the responses of the 3D objects to be printed within the group may be controlled and equalized.

Accordingly, the system (200) may include an object grouper (202) to group 3D objects to be printed based on a similarity of a characteristic of the 3D objects to be printed. As described above, the characteristic on which grouping is based may be of a variety of types and may include an object dimensional characteristic in one example. In another example, the characteristic may be a thermal characteristic. In one particular example, the thermal characteristic may be determined based on a dimensional characteristic. For example, there may be a relationship between the size, or average cross-sectional area and the resulting thermal bleed.

The system (200) may also include a device assigner (204) to assign different groups of 3D objects to be printed to different additive manufacturing devices. That is, in this example, the system (200) alters a setting of the additive manufacturing operation and also assigns the 3D printed objects to particular additive manufacturing devices which will operate based on the altered settings. For example, 3D objects to be printed that have an average cross-sectional area greater than a predetermined value may be assigned to a first additive manufacturing device while 3D objects to be printed that have an average cross-sectional area smaller than the predetermined value, are assigned to a second additive manufacturing device.

As described above, the system (200) includes a setting controller (206) to alter, per group, additive manufacturing settings of the additive manufacturing devices based on the characteristics of the associated 3D objects to be printed. As described above, there are any number of ways to adjust the additive manufacturing settings. Examples include adjusting build bed temperature, energy source activation parameters, agent deposition settings, and/or a variety of post-printing operations. While specific reference is made to a few examples of adjustments that may be made, any number of adjustments may be made based on 3D object group characteristics.

The system (200) described herein may be implemented on a computing device that is coupled to the additive manufacturing device, where such an additive manufacturing device is a fusing-agent based system, a system where a "green" part is passed to a sintering device to sinter particles together, a selective laser sintering device, a selective laser melting device, a fused deposition modelling device, and a stereolithographic device.

Figure 3:
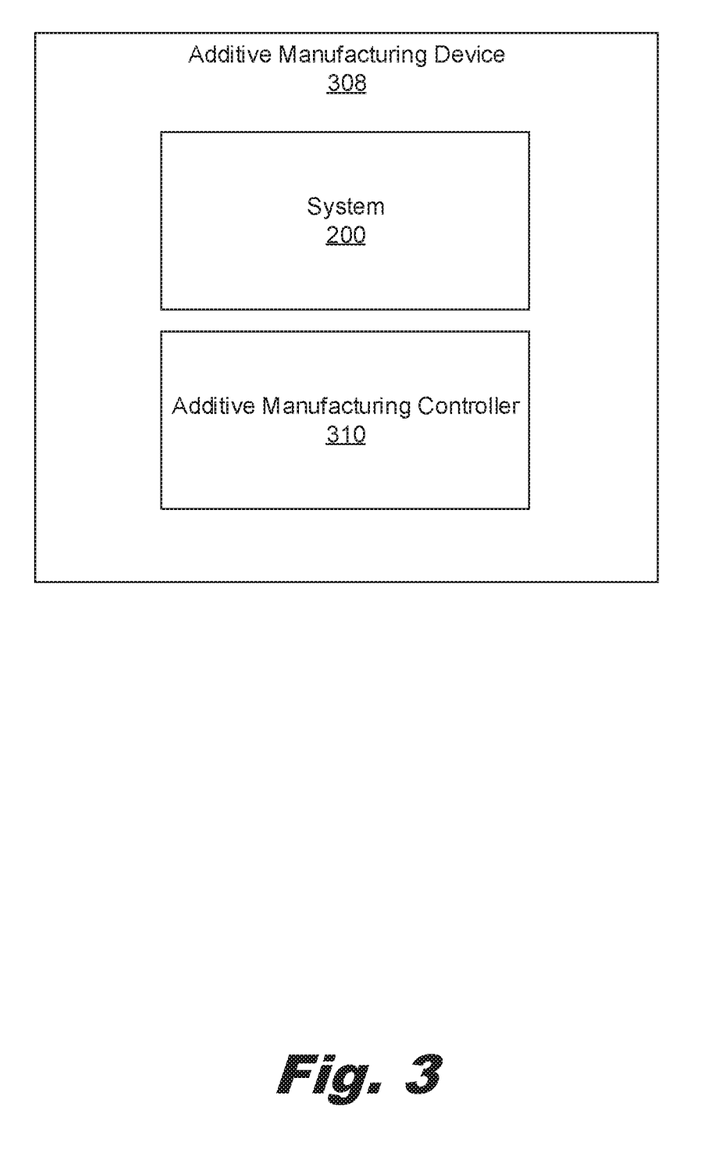
FIG. 3 is a block diagram of an additive manufacturing device for altering additive manufacturing settings based on characteristic similarities, according to an example of the principles described herein.

FIG. 3 is a block diagram of an additive manufacturing device (308) for altering additive manufacturing settings based on characteristic similarities, according to an example of the principles described herein. That is, as described above, in some examples, the system (200) is communicatively coupled to the additive manufacturing device (308). In this example, the system (200) may be disposed on the additive manufacturing device (308) itself. As described above, the additive manufacturing device (308) may be of different types. For example, it may be a fusing-agent based system, a system where a "green" part is passed to a sintering device to sinter particles together, a selective laser sintering device, a selective laser melting device, a fused deposition modelling device, and a stereolithographic device.

In this example, the additive manufacturing device (308) may receive a queue of particular 3D objects to be printed, may group the objects as described above, and may then manufacture one of the groups. Specifically, the settings controller (FIG. 2, 206) of the system (200) alters (FIG. 1, block 103) additive manufacturing settings by selecting a group for manufacturing in a particular additive manufacturing device (308).

In another example, the system (200) of the additive manufacturing device (308) may group 3D objects to be printed, alter certain settings, and then print multiple of the groups. In one particular example, different groups may be manufactured sequentially. For example, objects with an amount of thermal bleed falling within a predetermined range may be manufactured as a batch, and settings of the additive manufacturing device (308) may then be adjusted to process another batch. Accordingly, the alteration (FIG. 1, block 103) of the additive manufacturing settings by the setting controller (FIG. 2, 206) may include determining a batch sequence of the 3D objects to be printed in a particular additive manufacturing device (308).

In another particular example, different groups may be manufactured simultaneously. For example, 3D objects to be printed with a large average cross-sectional size, as compared to other 3D objects to be printed in the queue, may be manufactured as a batch in one location of the print bed while objects with a smaller average cross-sectional size, may be simultaneously manufactured as a second batch in a second location of the print bed. Accordingly, in this example, the alteration (FIG. 1, block 103) of the additive manufacturing settings by the setting controller (FIG. 2, 206) includes determining a location within a print bed, where the 3D objects will be printed. This may include separating the groups in the z-direction, for example with higher temperature groups on top, but may also include separating the groups in the x- or y-directions. In this example, the additive manufacturing device (308) may change its setting as each group is printed.

In this example, the additive manufacturing device (308) includes an additive manufacturing controller (310) to control the additive manufacturing device (308). That is, the additive manufacturing controller (310) instructs the additive manufacturing device (308), and each of its constituent components, to form the 3D printed object. Specifically, in a fusing agent-based system, the additive manufacturing controller (310) may direct a build material distributor to add a layer of build material. Further, the additive manufacturing controller (310) may send instructions to direct the printhead to selectively deposit a fusing agent onto the surface of a layer of the build material. The additive manufacturing controller (310) may also direct the printhead to eject the agent at specific locations to form a 3D printed object slice.

Figure 4:
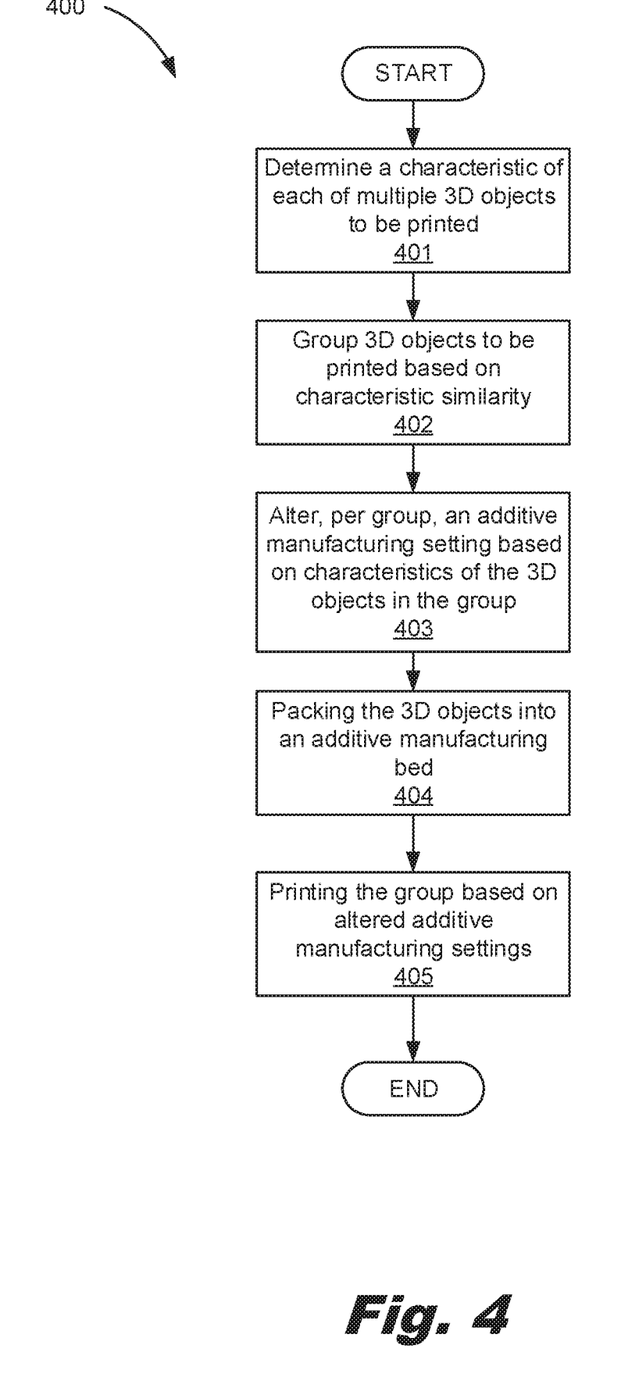
FIG. 4 is a flow chart of a method for altering additive manufacturing settings based on characteristic similarities, according to another example of the principles described herein.

FIG. 4 is a flow chart of a method (400) for altering additive manufacturing settings based on characteristic similarities, according to another example of the principles described herein. According to the method (400), at least one characteristic for each of multiple 3D objects to be printed is determined (block 401) and the 3D objects to be printed are grouped (block 402) based on characteristic similarity. As described above, the grouping (block 402) may be based on multiple characteristics. For example, a 3D object to be printed with a large average cross-sectional area, as defined by a threshold, that is largely yellow may have similar thermal behaviors as a 3D object to be printed with a small average cross-sectional area, as defined by the threshold, that is largely black. Accordingly, these parts, may be grouped together based on the cumulative effect of the various characteristics on their expected thermal responses to additive manufacturing.

Additive manufacturing settings are then altered (block 403), per group, based on the characteristics of 3D objects to be printed that form the group. These operations may be performed as described above in connection with FIG. 1.

In some examples, the method (400) may include additional operations. For example, the 3D objects to be printed that form a group may be packed (block 404) into a virtual representation of an additive manufacturing bed. That is, the arrangement of the 3D objects to be printed may be digitally simulated such that any additive manufacturing operation may form the objects based on this arrangement.

In some examples, the method (400) includes printing (block 405) the group of 3D objects based on the altered additive manufacturing settings. This includes controlling the components that deposit and act on the raw materials, to generate a 3D object. In some examples, this control may include further refining the additive manufacturing settings. For example, as described above, the grouping may identify a baseline similarity between different 3D objects to be printed. However, within each 3D object to be printed there may still be differences in the structure. That is, the system (FIG. 2, 200) may classify 3D objects to be printed based on average feature sizes. This classification sets a rough estimate baseline for printing and cooling operations, and those baselines can be adjusted based on other characteristics of the 3D object to be printed.

As a particular example, a figurine may have an average cross-sectional area of a particular size such that it is grouped with particular 3D objects to be printed. This figurine may have arms and fingers, which are smaller features as compared to the torso of the figurine. Accordingly, the additive manufacturing settings which may be adjusted based on an average cross-sectional area of the figurine, may be further adjusted to facilitate proper fusing of those smaller areas. For example, more detailing agent may be placed on the torso region of the figurine as compared to the arms and fingers of the figurine. This further refinement ensures that the 3D object in general is manufactured according to settings which would optimize its quality, but the individual constituent parts of the 3D object are also manufactured according to settings which would optimize that constituent part quality.

Figure 5:
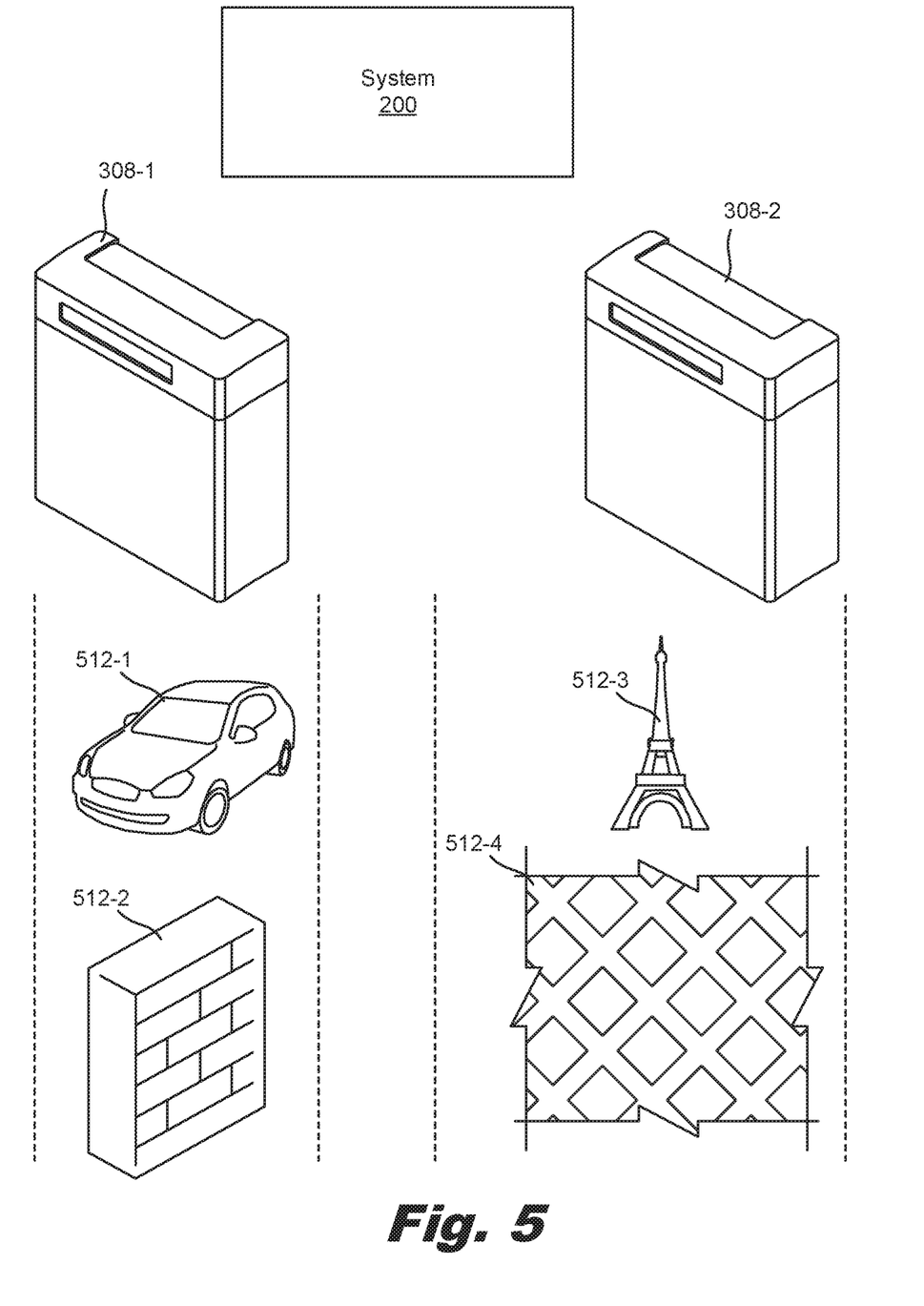
FIG. 5 depicts different 3D objects to be printed being grouped, according to an example of the principles described herein.

FIG. 5 depicts different 3D objects (512) to be printed being grouped, according to an example of the principles described herein. In the example depicted in FIG. 5, the system (200) is not disposed on an additive manufacturing device (308), but is on a separate computing device. In this example, in addition to altering the additive manufacturing settings, the system (200), and more specifically the device assigner (FIG. 2, 204), may assign grouped 3D objects (512) to be printed at different additive manufacturing devices (308-1, 308-2).

As described above, the grouping may be based on any number of criteria. FIG. 5 depicts a particular example where 3D objects (512) are grouped based on feature size, or an average cross-sectional area. For example, a first object (512-1) may be a 1:12 scale model of a car, a second object (512-2) may be a solid rectangle of fused material, a third object (512-3) may be a small figure of the Eiffel Tower and a fourth object (512-4) may be a lattice structure, Note that the criteria depicted in FIG. 5 is cross-sectional area, not bounding box size. Accordingly, the lattice structure object (512-4) may be large and nevertheless grouped with the small desktop figurine object (512-3) of the Eiffel Tower on account of the lattice structure having small cross-sectional features.

In this example, the 3D objects (512) with larger features, i.e., the 1:12 model of the car and the solid rectangle are packed into and printed by a first additive manufacturing device (308-1) which may be operated with a certain set of settings tailored to optimize the quality of these 3D objects (512) to be printed. For example, the bed temperature may be set to a value to prevent over-fusing of these objects (512), which value is based on a characteristic of the objects (512) that make up this group.

By comparison, the 3D objects (512) with smaller features, i.e., the figurine of the Eiffel Tower and the lattice structure, are packed into and printed by a second additive manufacturing device (308-2) which may be operated with a different set of settings, which different set are tailored to optimize the quality of the small 3D printed objects. For example, the bed temperature of the second additive manufacturing device (308-2) may be set to a value that is higher than a bed temperature of the first additive manufacturing device (308-2) to ensure these small features properly fuse. As with the other group, the value of the bed temperature is based on a characteristic of the objects (512) that make up this group. While particular reference is made to particular groupings based on particular criteria, the 3D printed objects (512) described herein may be grouped based on any criteria.

Figure 6:
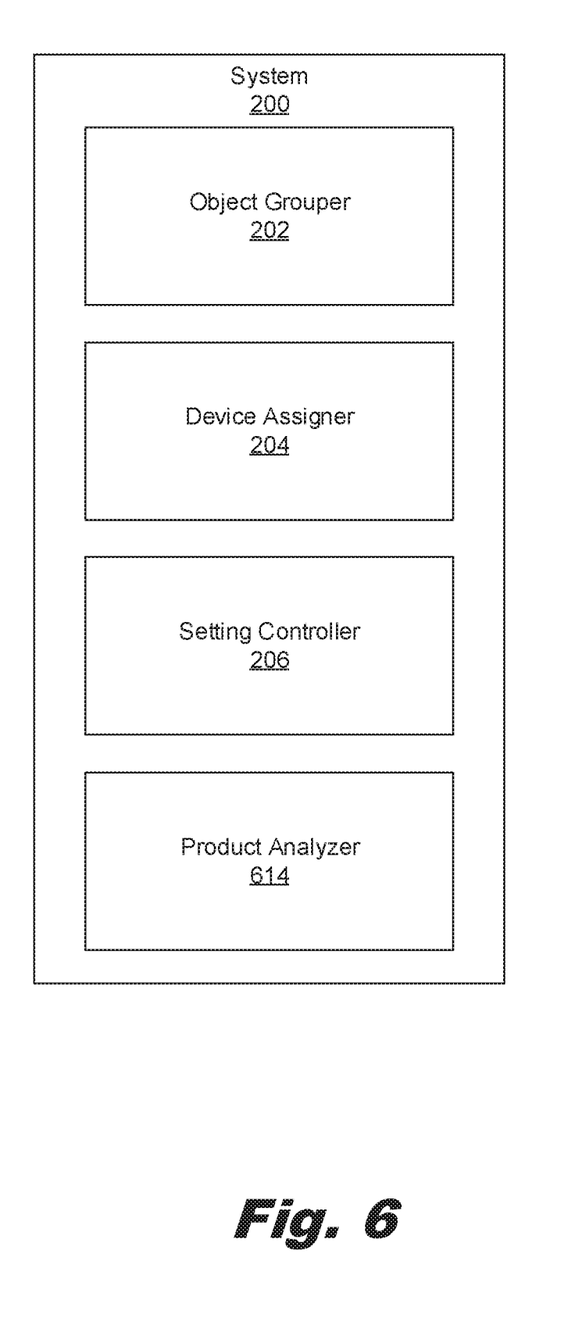
FIG. 6 is a block diagram of a system for altering additive manufacturing settings based on characteristic similarities, according to another example of the principles described herein.

FIG. 6 is a block diagram of a system (200) for altering additive manufacturing settings based on characteristic similarities, according to another example of the principles described herein. As described above, the system (200) may include an object grouper (202), device assigner (204), and setting controller (206). In addition, the system (200) may include a product analyzer (614) to determine the characteristic. That is, the product analyzer (614) determines a value, or other quantitative measure of the characteristic, for each 3D object (FIG. 5, 512) to be printed, such that they may be grouped. In some examples, the product analyzer (614) may read the value from a received file. That is, a file may be associated with each 3D object (FIG. 5, 512) to be printed and this file may include metadata indicative of the characteristic, whether the characteristic be a bounding box size, an average cross-sectional area, a thermal bleed measure, or any other type of criteria.

In some examples, the product analyzer (614) may determine the characteristic based on the file. For example, the file may include metadata indicating areas where fusing material is to be applied and/or coordinates of different points on the 3D object (FIG. 5, 512) to be printed. From this data, the product analyzer (614) may calculate the characteristics.

In yet another example, the product analyzer (614) is a simulator to simulate additive manufacturing to determine a thermal characteristic. That is, as described above, the characteristic of the 3D object (FIG. 5, 512) which is used as a criterion for object grouping, may be a thermal characteristic. In this example, the simulator simulates the manufacturing process to evaluate how the 3D object (FIG. 5, 512) to be printed is predicted to respond to the manufacturing conditions. Such a simulating product analyzer (614) may provide an accurate estimate of 3D object (FIG. 5, 512) thermal response/behavior such that the 3D objects (FIG. 5, 512) to be printed may be grouped and optimized simultaneously.

Figure 7:
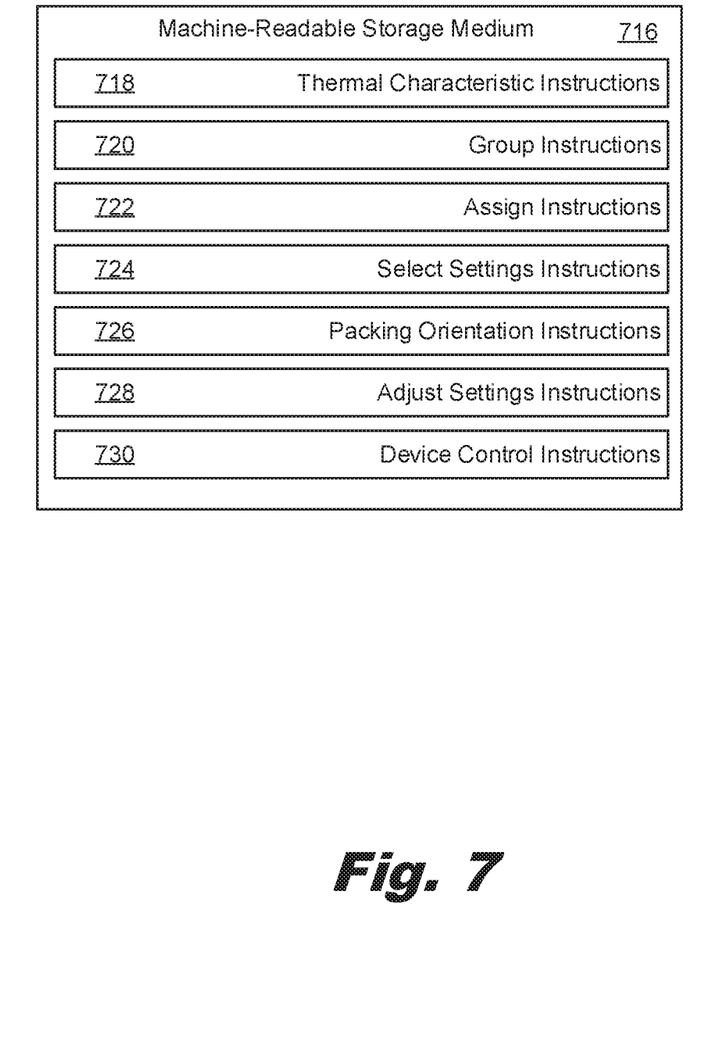
FIG. 7 depicts a non-transitory machine-readable storage medium for altering additive manufacturing settings based on characteristic similarities, according to an example of the principles described herein.

FIG. 7 depicts a non-transitory machine-readable storage medium (716) for altering additive manufacturing settings based on characteristic similarities, according to an example of the principles described herein. To achieve its desired functionality, a computing system includes various hardware components. Specifically, a computing system includes a processor and a machine-readable storage medium (716). The machine-readable storage medium (716) is communicatively coupled to the processor. The machine-readable storage medium (716) includes a number of instructions (718, 720, 722, 724, 726, 728, 730) for performing a designated function. The machine-readable storage medium (716) causes the processor to execute the designated function of the instructions (718, 720, 722, 724, 726, 728, 730).

Referring to FIG. 7, thermal characteristic instructions (718), when executed by the processor, cause the processor to determine, for each 3D object (FIG. 5, 512) to be printed; a thermal characteristic. Group instructions (720), when executed by the processor, may cause the processor to, group 3D objects (FIG. 5, 512) to be printed based on characteristic similarity. Assign instructions (722), when executed by the processor, may cause the processor to assign different groups of 3D objects (FIG. 5, 512) to be printed to different additive manufacturing devices (FIG. 3, 308), Select settings instructions (724), when executed by the processor, may cause the processor to select, per group, additive manufacturing settings based on the characteristics of the 3D objects (FIG. 5, 512) to be printed that form the group. Packing orientation instructions (726), when executed by the processor, may cause the processor to determine, per group, a packing orientation of the associated 3D objects (FIG. 5, 512) to be printed in an additive manufacturing device (FIG. 3, 308). Adjust settings instructions (728), when executed by the processor, may cause the processor to adjust, per 3D object (FIG. 5, 512) to be printed within each group, selective additive manufacturing settings based on object-specific thermal characteristic for that 3D object (FIG. 5, 512) to be printed. Device control settings (730), when executed by the processor, may cause the processor to control an additive manufacturing device (FIG. 3, 308) based on adjusted additive manufacturing settings.

Such systems and methods 1) increase 3D printed object quality; 2) enhance consistency among different instances of a 3D printed object; 3) increase additive manufacturing efficiency; 4) optimize the packing of 3D objects to be printed for easier process control and better part quality; and 5) is simple, effective, and cost-effective to implement.

What is claimed is:

1. A method, comprising:
   determining a characteristic of each of multiple three-dimensional (3D) objects to be printed;
   grouping 3D objects to be printed based on characteristic similarity;
   assigning different groups of 3D objects to be printed to different additive manufacturing devices;
   selecting, per group, additive manufacturing settings based on the characteristics of the 3D objects to be printed that form that group;
   determining, per group, a packing orientation of associated 3D objects to be printed in an additive manufacturing device;
   altering, for a group of 3D objects to be printed, the additive manufacturing settings based on the characteristics of the 3D objects to be printed that form the group; and
   controlling the additive manufacturing device based on the altered additive manufacturing settings.

2. The method of claim 1, further comprising printing the 3D objects based on altered additive manufacturing settings.

3. The method of claim 1, wherein the characteristic is a bounding box size for the 3D object to be printed.

4. The method of claim 1, wherein the characteristic is an average cross-sectional area of the 3D object to be printed.

5. The method of claim 1, wherein the characteristic is a thermal characteristic of the 3D object to be printed.

6. The method of claim 1, wherein the characteristic is an orientation of the 3D objects to be printed.

7. The method of claim 1, wherein the characteristic is a color of the 3D object to be printed.

8. The method of claim 1, wherein the additive manufacturing setting is selected from the group consisting of:
   a bed temperature;
   an energy source temperature;
   an energy source activation power;
   an energy source activation time;
   a print mode;
   an agent deposition setting;
   a packaging orientation; and
   a post processing operation setting.

9. A system, comprising:
   an object grouper to group three-dimensional (3D) objects to be printed based on a similarity of a characteristic of the 3D objects to be printed;
   a device assigner to assign different groups of 3D objects to be printed to different additive manufacturing devices;
   a product analyzer to select, per group, additive manufacturing settings based on the characteristics of the 3D objects to be printed that form the group;
   the product analyzer to determine, per group, a packing orientation of associated 3D objects to be printed in an additive manufacturing device that form that group;
   a setting controller to alter, per group, additive manufacturing settings of the additive manufacturing devices based on the characteristics of the associated 3D objects to be printed; and
   an additive manufacturing controller to control the additive manufacturing devices based on the altered additive manufacturing settings.

10. The system of claim 9, wherein the characteristic is an object dimensional characteristic.

11. The system of claim 9, wherein the characteristic is a thermal characteristic.

12. The system of claim 9, wherein the product analyzer to determines the characteristic.

13. The system of claim 12, wherein the product analyzer is a simulator to simulate additive manufacturing of a 3D object to be printed to determine a thermal characteristic.

14. A non-transitory machine-readable storage medium encoded with instructions executable by a processor, the machine-readable storage medium comprising instructions to:
   determine, for each three-dimensional (3D) object to be printed, a characteristic;
   group 3D objects to be printed based on characteristic similarity;
   assign different groups of 3D objects to be printed to different additive manufacturing devices;
   select, per group, additive manufacturing settings based on the characteristics of the 3D objects to be printed that form the group;
   determine, per group, a packing orientation of associated 3D objects to be printed in an additive manufacturing device;
   adjust, per 3D object to be printed within each group, selected additive manufacturing settings based on object-specific characteristics for that 3D object to be printed; and
   control the additive manufacturing device based on adjusted additive manufacturing settings.

15. The non-transitory machine-readable storage medium of claim 14, wherein the characteristic is determined based on a dimensional characteristic of the 3D object to be printed.

* * * * *